US011126265B2

(12) United States Patent
Chen et al.

(10) Patent No.: US 11,126,265 B2
(45) Date of Patent: Sep. 21, 2021

(54) WEARABLE HAPTIC FEEDBACK

(71) Applicant: Ford Global Technologies, LLC, Dearborn, MI (US)

(72) Inventors: Yifan Chen, Ann Arbor, MI (US); Kwaku O. Prakah-Asante, Commerce Township, MI (US); David Melcher, Ypsilanti, MI (US); Jeffrey Allen Greenberg, Ann Arbor, MI (US); Ali Hassani, Ann Arbor, MI (US); Devinder Singh Kochhar, Ann Arbor, MI (US); Jeffrey Brian Yeung, Canton, MI (US); Kenneth Michael Mayer, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/621,352

(22) PCT Filed: Jun. 14, 2017

(86) PCT No.: PCT/US2017/037366
§ 371 (c)(1),
(2) Date: Dec. 11, 2019

(87) PCT Pub. No.: WO2018/231211
PCT Pub. Date: Dec. 20, 2018

(65) Prior Publication Data
US 2020/0117275 A1    Apr. 16, 2020

(51) Int. Cl.
*G06F 3/01* (2006.01)
*B60K 37/06* (2006.01)

(52) U.S. Cl.
CPC .............. *G06F 3/016* (2013.01); *B60K 37/06* (2013.01); *G06F 3/014* (2013.01); *B60K 2370/569* (2019.05)

(58) Field of Classification Search
CPC ......... G06F 3/016; G06F 3/014; B60K 37/06; B60K 2370/569; B60K 2370/56; B60K 2370/157; B60K 35/00
See application file for complete search history.

(56) References Cited

U.S. PATENT DOCUMENTS

| 9,550,419 B2 | 1/2017 | Habashima et al. |
| 9,552,519 B2 | 1/2017 | Gurovich et al. |
| 10,117,062 B2 * | 10/2018 | Macneille ............... H04W 4/02 |
| 10,178,269 B2 * | 1/2019 | Takano ............... G06F 3/04883 |
| 10,836,256 B2 * | 11/2020 | Greenberg ............. G06F 1/163 |

(Continued)

OTHER PUBLICATIONS

International Search Report of the International Searching Authority for PCT/US2017/037366 dated Aug. 31, 2017.

(Continued)

*Primary Examiner* — Stephen G Sherman
(74) *Attorney, Agent, or Firm* — Brandon Hicks; Bejin Bieneman PLC

(57) ABSTRACT

A computer includes a processor that is programmed to receive input specifying a component in a vehicle and data specifying a location of a wearable device in the vehicle. The processor is programmed to determine a distance of the wearable device from a location of the component and actuate the wearable device to provide haptic output based on the determined distance.

19 Claims, 5 Drawing Sheets

(56) References Cited

U.S. PATENT DOCUMENTS

| | | |
|---|---|---|
| 2004/0108992 A1 | 6/2004 | Rosenberg |
| 2008/0120029 A1 | 5/2008 | Zelek et al. |
| 2011/0093158 A1 | 4/2011 | Theisen et al. |
| 2013/0046592 A1 | 2/2013 | Ross |
| 2013/0131985 A1 | 5/2013 | Weiland et al. |
| 2013/0170710 A1 | 7/2013 | Kuoch et al. |
| 2014/0309847 A1 | 10/2014 | Ricci |
| 2015/0288804 A1* | 10/2015 | Kadous .................. G06F 21/62 455/418 |
| 2016/0349912 A1 | 12/2016 | Faubert et al. |
| 2017/0003139 A1 | 1/2017 | Taylor et al. |
| 2017/0168630 A1* | 6/2017 | Khoshkava ............. G06F 3/044 |

OTHER PUBLICATIONS

"Audi's eKurzinfo App Is a Modern, Augmented Reality Owner's Manual," www.autoblogliscensing.com, Aug. 14, 2013, 5 pages.

\* cited by examiner

WEARABLE HAPTIC FEEDBACK

BACKGROUND

Vehicle components and systems have become more functionally complex over the years. A number and complexity of human machine interface (HMI) devices that are available to vehicle users have increased. Vehicles instrument panel, etc. are often uncomfortably crowded with buttons, knobs, touch screens, etc. Under present arrangements, users often have difficulty locating desired HMI elements, and/or can be dangerously distracted in attempting to access such elements.

DETAILED DESCRIPTION

Introduction

Figure 1:
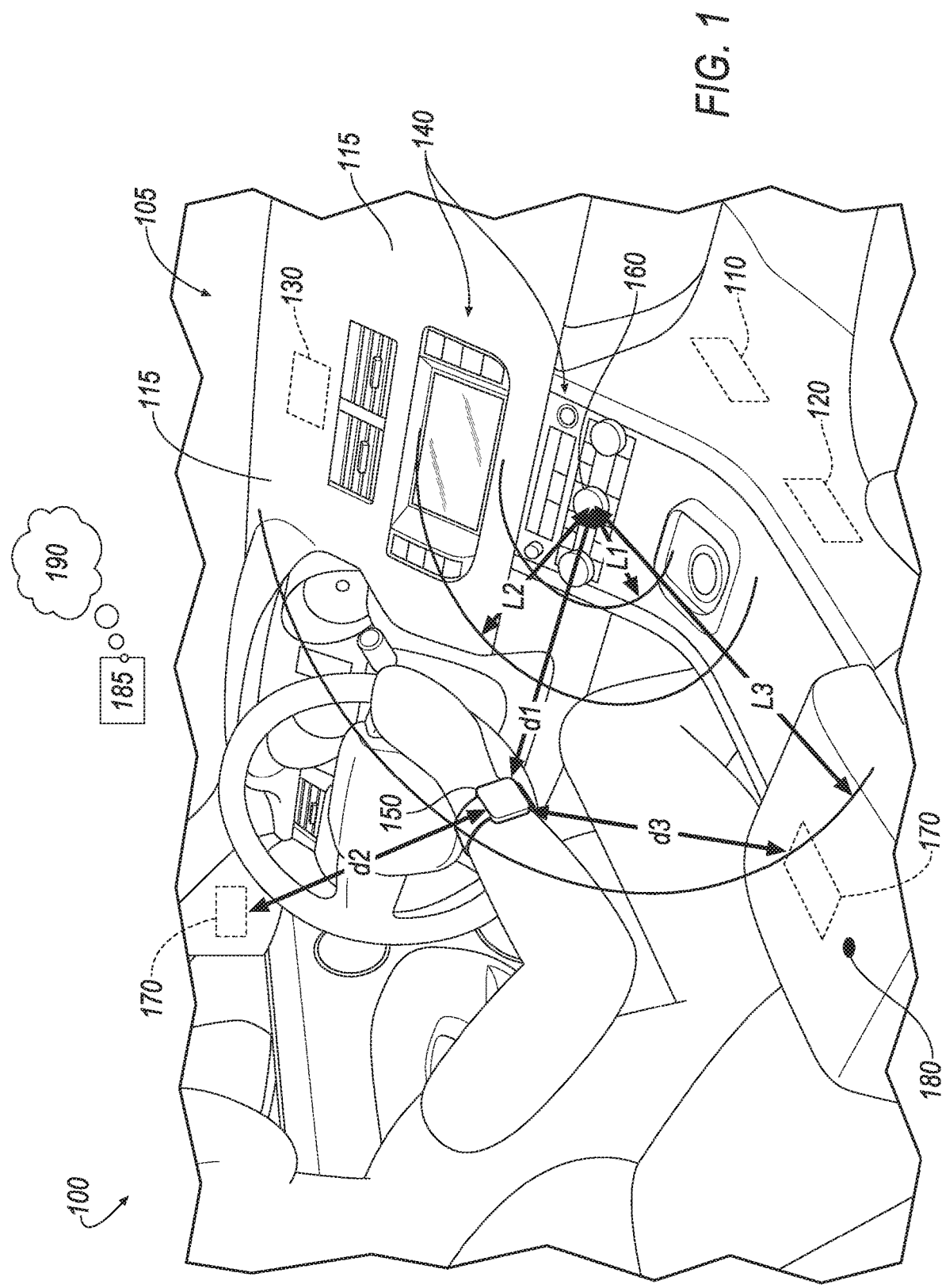
FIG. 1 is a perspective view of a wearable device and a vehicle passenger compartment including an instrument panel.

Disclosed herein is a computer including a processor that is programmed to receive input specifying a component in a vehicle and data specifying a location of a wearable device in the vehicle. The processor is further programmed to determine a distance of the wearable device from a location of the component and actuate the wearable device to provide haptic output based on the determined distance.

The computer may be further programmed to determine the location of the wearable device in a vehicle coordinate system based on a wireless signal received from a vehicle wireless transceiver.

The computer may be further programmed to specify a variation in the haptic output according to a detected change in the determined distance of the wearable device from the location of the component.

The computer may be further programmed to stop providing haptic output upon determining that the determined distance is less than a first distance threshold, and actuate the wearable device to provide haptic output with a first frequency upon determining that the determined distance is greater than the first distance threshold and less than a second distance threshold. The computer may be further programmed to actuate the wearable device to provide haptic output with a second frequency upon determining that the determined distance is greater than the second distance threshold and less than a third distance threshold, and stop providing haptic output upon determining that the determined distance is greater than the third distance threshold, wherein the third distance threshold is greater than the second distance threshold.

The computer may be further programmed to determine whether the wearable device is within a predetermined area associated with the component, based on a wireless signal received from a vehicle wireless transceiver, and actuate the wearable device to provide haptic output with a first frequency upon determining that the device is within the predetermined area.

The computer may be further programmed to actuate the wearable device to provide haptic output with a second frequency upon determining that the device is outside the predetermined area.

The area may be cylindrically shaped and may have a longitudinal axis perpendicular to an exterior surface of a vehicle instrument panel.

The area may be bell-shaped and may encompass the component, and the bell-shaped area may have a flat bottom touching a vehicle instrument panel.

The area may have a solid rectangle shape with a bottom surface touching a vehicle instrument panel.

The computer may be further programmed to provide haptic output with an intensity that is at least in part based on the determined distance.

The computer may be further programmed to provide haptic output with an activation duty cycle that is at least in part based on the determined distance, wherein the activation duty cycle is a ratio of an active time duration to an activation time period.

Further disclosed herein is a method including receiving input specifying a component in a vehicle and data specifying a location of a wearable device in the vehicle, determining a distance of the wearable device from a location of the component, and actuating the wearable device to provide haptic output based on the determined distance.

The method may further include determining the location of the wearable device in a vehicle coordinate system based on a wireless signal received from a vehicle wireless transceiver.

The method may further include specifying a variation in the haptic output according to a detected change in the determined distance of the wearable device from the location of the component.

The method may further include stopping providing haptic output upon determining that the determined distance is less than a first distance threshold, actuating the wearable device to provide haptic output with a first frequency upon determining that the determined distance is greater than the first distance threshold and less than a second distance threshold, and actuating the wearable device to provide haptic output with a second frequency upon determining that the determined distance is greater than the second distance threshold and less than a third distance threshold, stopping providing haptic output upon determining that the determined distance is greater than the third distance threshold, wherein the third distance threshold is greater than the second distance threshold.

The method may further include determining whether the wearable device is within a predetermined area associated with the component, based on a wireless signal received from a vehicle wireless transceiver, and actuating the wearable device to provide haptic output with a first frequency upon determining that the device is within the predetermined area.

The method may further include actuating the wearable device to provide haptic output with a second frequency upon determining that the device is outside the predetermined area.

The area may have a solid rectangle shape with a bottom surface touching a vehicle instrument panel.

The method may further include providing haptic output with an intensity that is at least in part based on the determined distance.

The method may further include providing haptic output with an activation duty cycle that is at least in part based on the determined distance, wherein the activation duty cycle is a ratio of an active time duration to an activation time period.

Further disclosed is a computing device programmed to execute the any of the above method steps. Yet further disclosed is a vehicle comprising the computing device.

Yet further disclosed is a computer program product, comprising a computer readable medium storing instructions executable by a computer processor, to execute any of the above method steps.

Exemplary System Elements

FIG. 1 show an example wearable device 150 and a vehicle 100 passenger compartment 105 (or interior). The vehicle 100 may be powered in a variety of known ways, e.g., with an electric motor and/or an internal combustion engine. The vehicle 100 may be a land vehicle such as a car, truck, etc. A vehicle 100 may include a computer 110, actuator(s) 120, and sensor(s) 130, wireless transceiver(s) 170, and an instrument panel 115 with multiple HMIs 140. The vehicle 100 may have a specified center point 180. The center point 180 may be a point at which longitudinal and lateral axes of the vehicle 100 intersect. As another example, the center point 180 may be a center of gravity of the vehicle 100.

The vehicle 100 may include a vehicle 100 body defining the vehicle 100 passenger compartment 105. The vehicle 100 body may include a roof, a floor, and a plurality of pillars. The passenger compartment 105 may include an instrument panel 115 with multiple HMIs 140, one or more seats, etc. The instrument panel 115 may be formed of composite material, plastic, etc. The HMIs 140 may be configured to receive information from a user, such as a human operator, during operation of the vehicle 100. For example, a user may touch, slide, rotate, pull, push, etc. a knob 160 to select activate, configure, etc. a vehicle 100 component. The vehicle 100 computer 110 may output information to the HMIs 140 such as displays, speakers, etc.

The computer 110 includes a processor and a memory such as are known. The memory includes one or more forms of computer-readable media, and stores instructions executable by the computer 110 for performing various operations, including as disclosed herein.

The computer 110 may include programming to operate one or more of land vehicle brakes, propulsion (e.g., control of acceleration in the vehicle by controlling one or more of an internal combustion engine, electric motor, hybrid engine, etc.), steering, climate control, passenger compartment and/or exterior lights, etc.

The computer 110 may include or be communicatively coupled to, e.g., via a vehicle 100 communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle and/or receive messages from the various devices, e.g., an actuator 120, an HMI 140, etc. Alternatively or additionally, in cases where the computer 110 actually comprises multiple devices, the vehicle 100 communication network may be used for communications between devices represented as the computer 110 in this disclosure. Further, as mentioned below, various controllers and/or sensors may provide data to the computer 110 via the vehicle communication network.

In addition, the computer 110 may be configured for communicating through a vehicle-to-infrastructure (V-to-I) interface with other vehicles, and/or a remote computer 185 via a network 190. The network 190 represents one or more mechanisms by which the computer 110 and the remote computer 185 may communicate with each other, and may be one or more of various wired or wireless communication mechanisms, including any desired combination of wired (e.g., cable and fiber) and/or wireless (e.g., cellular, wireless, satellite, microwave and radio frequency) communication mechanisms and any desired network topology (or topologies when multiple communication mechanisms are utilized). Exemplary communication networks include wireless communication networks (e.g., using one or more of cellular, Bluetooth, IEEE 802.11, etc.), dedicated short range communications (DSRC), local area networks (LAN) and/or wide area networks (WAN), including the Internet, providing data communication services.

The vehicle 100 actuators 120 are implemented via circuits, chips, or other electronic and or mechanical components that can actuate various vehicle subsystems in accordance with appropriate control signals as is known. The actuators 120 may be used to control braking, acceleration, and steering of the vehicles 100.

Vehicle 100 sensors 130 may include a variety of devices known to provide data via the vehicle communications bus. For example, the sensors may include one or more cameras, radars, and/or Light Detection and Ranging (LIDAR) sensors 130 disposed in and/or on the vehicle 100 providing data encompassing at least some of the vehicle 100 passenger compartment 105 and/or exterior. A vehicle 100 computer 110 may receive data from the sensors 130 and operate the vehicle 100 based at least in part on the received data.

The vehicle 100 includes one or more wireless transceivers 170. The wireless transceiver(s) 170 may include known electronic circuitry such as a wireless (or radio frequency) signal transmitter, a wireless (or radio frequency) signal receiver, and an amplifier circuit to boost an outgoing and incoming radio frequency signal. The vehicle 100 computer 110 may be programmed to receive a wireless signal, via the signal receiver of the wireless transceiver 170. The computer 110 may be programmed to identify an identifier of a device such as the wearable device 150 transmitting wireless signals based on the received wireless signal. The wireless signal receiver may be configured to receive wireless transceivers 170 based on various wireless communication protocols, e.g., LTE, Bluetooth™, WAN, etc.

The wearable device 150 may be a watch, a ring, glasses, a pendant or necklace, etc. that can be worn by a vehicle 100 user. The device 150 may include a wireless signal transceiver capable of communicating with the vehicle 100 wireless transceivers 170 via a wireless signal. The device 150 includes a processor and a haptic actuator. A haptic actuator may be actuated to apply force, vibration, and/or movement to a user body, e.g., wrist, finger, etc. The device 150 processor may be programmed to actuate the haptic component to provide haptic output. The device 150 processor may actuate the haptic actuator based on a command received from the vehicle 100 computer 110. For example, the received command may include haptic parameters such as a haptic intensity value and/or a turn on or off request. When a user wears the device 150, the user will typically feel the haptic output when the computer 110 actuates the device 150 haptic actuator. Further, the user may distinguish various frequencies, intensities, and/or pulse duration, etc. of the provided haptic output.

As discussed above, a vehicle 100 user may enter user requests to the vehicle 100 computer 110 via the vehicle 100 HMI 140. Typically, a vehicle 100 HMI 140 is associated with one or more specific operations, e.g., a knob 160 for adjusting a vehicle 100 cabin temperature. With increasing number of electronic and electrical components in the vehicles 100, a vehicle 100 user may have difficulty locating a vehicle 100 HMI 140 associated with an intended user request. As another example, looking for the respective HMI 140 may distract the vehicle 100 user from, e.g., steering the vehicle 100.

With reference to FIG. 1, the computer 110 may be programmed to receive input specifying a component in the vehicle 100 and data specifying a location of the wearable device 150 in the vehicle 10. The computer 110 may be programmed to determine a distance $d_1$ of the wearable device 150 from a location of the component, e.g., the knob 160. The computer 110 may be further programmed to actuate the wearable device 150 to provide haptic output based on the determined distance $d_1$. Thus, advantageously, the provided haptic output may assist a vehicle 100 user in locating the intended HMI 140 such as a knob 160.

In one example, the computer 110 may be programmed to receive the input specifying the component via, e.g., audio data received from a vehicle 100 microphone, a user gesture data received from a camera sensor 130, etc. The computer 110 may be programmed using signal processing techniques to determine a user request such as the received audio data. For example, the vehicle 100 user may receive audio data including a user request "how to change interior temperature?" The computer 110 may be programmed to determine that the knob 160 is associated with the received request, i.e., a user can adjust an interior temperature by actuating, e.g., rotating, the knob 160.

In the context of present disclosure, location data of a vehicle 100 component, e.g., the knob 160, refers to the location of the device 150 relative to the vehicle 100. Thus, the location data is determined in a vehicle 100 coordinate system, e.g., a reference multi-dimensional Cartesian coordinate system having a predetermined origin point included in the vehicle 100. For example, the location coordinates may include X, Y, Z coordinates of the device 150 with an origin at the vehicle 100 center point 180. X, Y, and Z may represent, respectively, longitudinal, lateral, and height coordinates of the device 150 location. Additionally or alternatively, a vehicle 100 coordinate system may include a spherical coordinate system having a predetermined origin point included in the vehicle 100, e.g., the center point 180. In a spherical coordinate system, the location coordinates may include a distance and an angle from the origin point. For example, the angle data may include a first angle relative to a horizontal plane, e.g., vehicle 100 floor, and a vertical plane perpendicular to the ground surface and passing through the vehicle 100 center point 180.

The computer 110 may be programmed to determine a location of the wearable device 150 in the vehicle 100 coordinate system based on a wireless signal received from a vehicle 100 wireless transceiver(s) 170. For example, the computer 110 may be programmed to receive, via the vehicle 100 wireless transceiver(s) 170, a wireless signal from the wearable device 150, and determine distances from the transceivers 170 to the device 150 based on the received wireless signals. The computer 110 may be programmed to determine two or more distances such as distances $d_2$, $d_3$, of the device 150 to the wireless transceivers 170, e.g., using techniques such as Free Space Path Loss (FSPL). The computer 110 may be programmed to determine a strength of a wireless signal of the device 150 based on data received from the wireless transceivers 170. Based on FSPL, a loss (weakening) of an electromagnetic signal over a straight path between a transmitter, e.g., the device 150, and a receiver, e.g., the wireless transceiver 170, may be proportional to the square of the distances $d_2$, $d_3$, and also proportional to the square of a frequency of the radio signal. Additionally or alternatively, the computer 110 may be programmed to determine an angle of wireless signal arrival. In other words, the computer 110 may be programmed to receive data including a direction of the device 150 relative to a wireless transceiver 170. In one example, the computer 110 may be programmed to determine location coordinates of the device 150 based on received data including distance and direction of the device 150 relative to the transceiver(s) 170.

The computer 110 may be programmed to determine a loss of the received signal based on determining the output power of the device 150 and the signal strength of the received signal based on data received from the wireless transceiver 170. The computer 110 may then determine the location coordinates of the device 150 based on the determined distances $d_2$, $d_3$, e.g., using triangulation techniques.

As discussed above, the vehicle 100 may include one or more sensors 130 such as LIDAR, a camera, etc., that have fields of view including the vehicle 100 passenger compartment 105. The computer 110 may be programmed to determine location coordinates of the device 150 using image processing techniques. Thus, additionally or alternatively, the computer 110 may be programmed to determine location coordinates of the device 150 and/or user's hand based on the received sensor 130 data.

Figure 2:
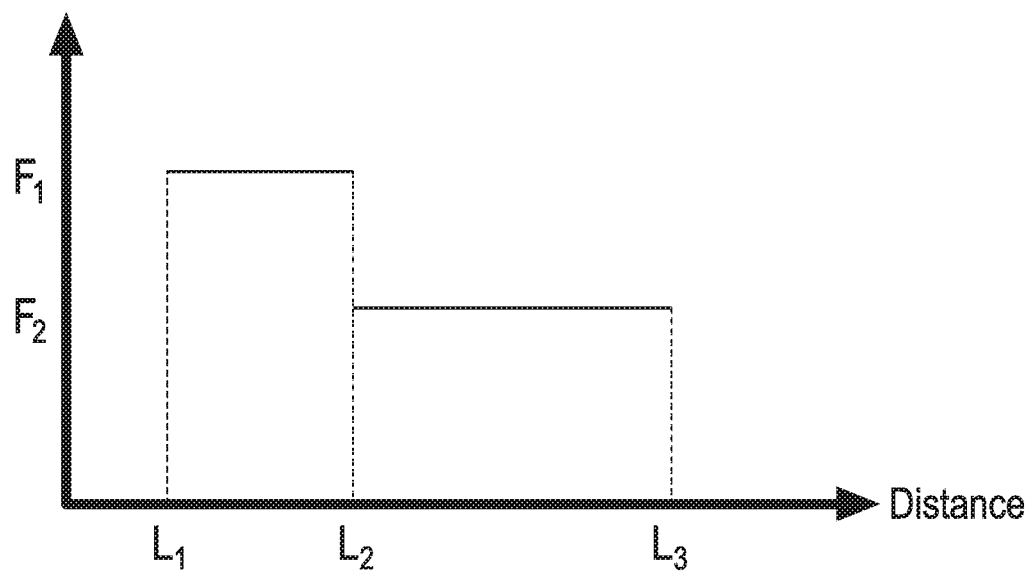
FIG. 2 is an exemplary graph depicting frequency and/or intensity of haptic output based on a distance of the wearable device to a vehicle component.

The computer 110 may be programmed to specify a variation in the haptic output according to a detected change in the determined distance $d_1$ of the wearable device 150 from the location of the HMI component, e.g., the knob 160. The computer 110 may be programmed to actuate the wearable device 150 to provide haptic output based on one or more distance thresholds. For example, as shown in FIG. 2, the computer 110 may be programmed to actuate the device 150 to stop providing a haptic output when the device 150 is within a first distance threshold $L_1$, e.g., 5 cm, from the knob 160. The computer 110 may be programmed to actuate the device 150 to provide haptic output with a first frequency $F_1$ upon determining that the distance $d_1$ is greater than the first distance threshold $L_1$, e.g., 5 cm, and less than a second distance threshold $L_2$, e.g., 30 cm. The computer 110 may be further programmed to actuate the device 150 to provide a haptic output with a second frequency $F_2$ upon determining that the distance $d_1$ is greater than the second distance threshold $L_2$ and less than a third threshold, e.g., 50 cm. The computer 110 may be programmed to stop providing a haptic output upon determining that the distance $d_1$ exceeds the third threshold. Thus, advantageously, such example changes of haptic output frequency and/or intensity as the users' hand approaches the vehicle component may assist the user to locate the HMI component.

The computer 110 may be programmed to provide haptic output with an intensity that is at least in part based on the determined distance $d_1$. A haptic intensity, in the context of this disclosure, refers to an amount of force, pressure, etc. applied by the haptic actuator. For example, a change of force applied by the haptic component to, e.g., a user's hand, may assist the user in locating the requested vehicle 100 component, e.g., the knob 160. In the context of this disclosure, the intensity, frequency, activation duty cycle, etc. of a haptic output are referred to as haptic output parameters. Thus, the computer 110 may be programmed to determine haptic output parameters and to actuate the device 150 to provide haptic output based on the determined haptic output parameters.

Figure 3:
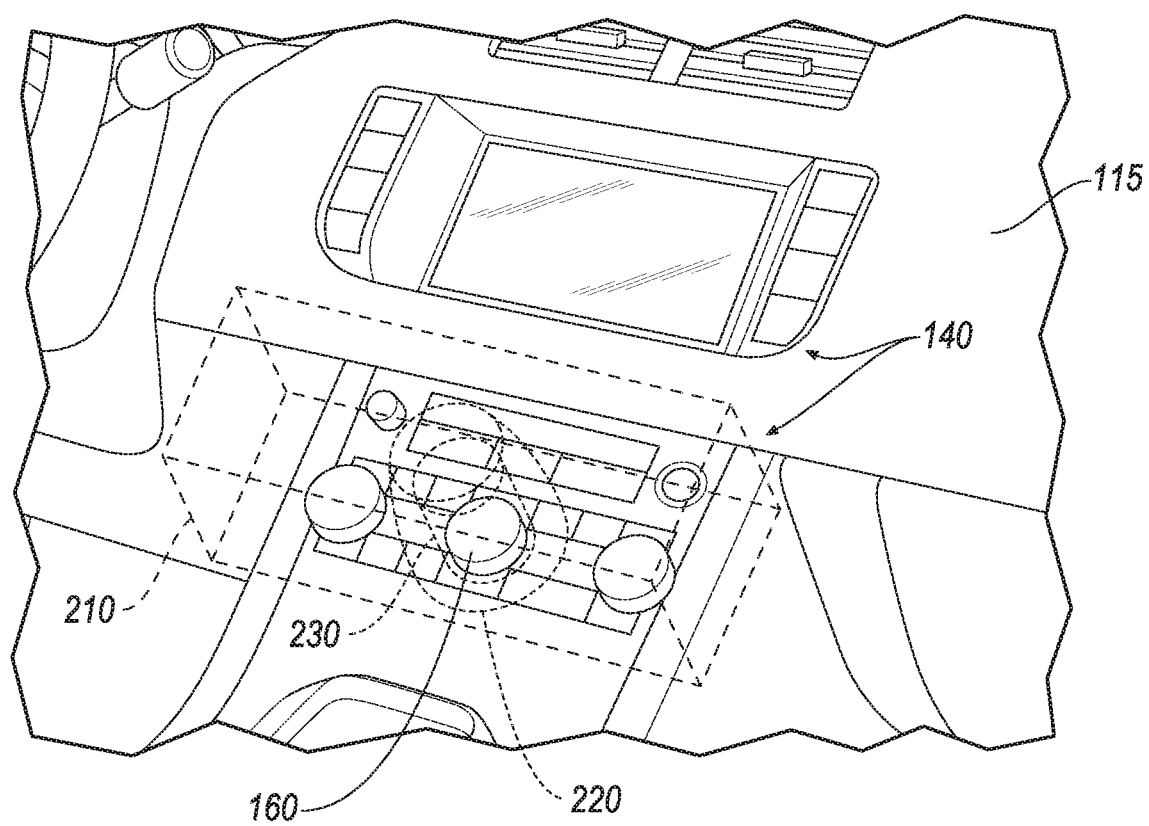
FIG. 3 shows a portion of the instrument panel of FIG. 1 and multiple areas around a component thereof.
Figure 4:
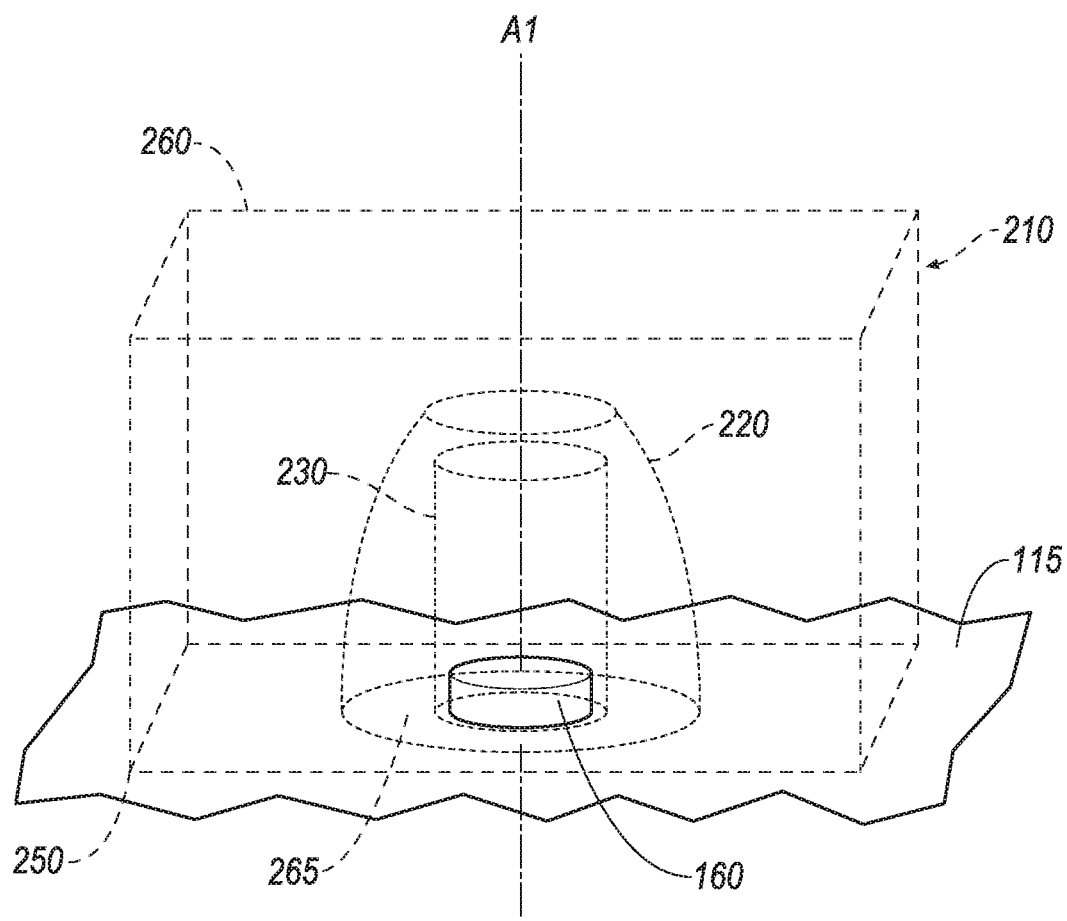
FIG. 4 is a detail view of the areas of FIG. 3.

With reference to FIGS. 3-4, the computer 110 may be programmed to determine whether the wearable device 150 is within a predetermined area (e.g., an area 210, 220, 230) associated with the component (e.g., the knob 160), based on a wireless signal received from the vehicle 100 wireless transceiver(s) 170. "Associated with the component," in the context of the present disclosure means that the area is defined (as discussed below) based on a location of the respective component, e.g., a spherical radius around the component. The computer 110 may be further programmed to actuate the wearable device 150 to provide haptic output with a first frequency $F_1$ upon determining that the device 150 is within the predetermined area (e.g., the area 210).

An area, in the context of present disclosure, is a volume, i.e., it is three-dimensional. An area such as areas 210, 220, 230 may have various shapes such as rectangular solid, bell-shaped, cylindrical, etc. The area may be defined in relation to the vehicle 100 HMIs 140. For example, the area 210 may have a solid rectangle shape with a bottom 250 at a vehicle 100 instrument panel 115. The area 210 top 260 may be spaced away from the instrument panel 115.

The area 220 may be bell-shaped and may encompass the HMI component, e.g., the knob 160. The bell-shaped area 220 may have a flat bottom 265 at a vehicle 100 instrument panel 115. As another example, the area 230 may be cylindrically shaped and may have a longitudinal axis A1 perpendicular to an exterior surface of the vehicle 100 instrument panel 115.

The computer 110 may be programmed to determine areas 210, 220, 230 based on information such as CAD (Computer-aided design) data stored in a computer 110 memory. The stored information may define shape, size, corners, surfaces, etc., of each of the areas 210, 220, 230. The stored data may define the area 210, 220, 230 relative to a reference point in the vehicle 100, e.g., a center point 180. The areas 210, 220, 230 may be determined in part based on a shape, size, etc., of vehicle 100 body, instrument panel 115, HMIs 140, etc.

In one example, the computer 110 may be programmed to receive CAD information of the vehicle 100 including body, instrument panel 115, HMIs 140, etc., from a remote computer 185, e.g., a service center computer. The computer 110 may be programmed to determine the areas 210, 220, 230 based on the received information and a user request. For example, the computer 110 may determine based on the user request that the knob 160 should be turned. The computer 110 may be programmed to transmit a request for CAD information of the vehicle 100 including the knob 160 location to the remote computer 185. The computer 110 may be then programmed to determine the areas 210, 220, 230 based on coordinates of the instrument panel 115, and/or location coordinates of the knob 160.

The computer 110 may be programmed to actuate the wearable device 150 to provide haptic output with a second frequency $F_2$ upon determining that the device 150 is outside a predetermined area such as the area 220. The computer 110 may be programmed to determine whether the device 150 is inside or outside an area based on location coordinates of the device 150 and coordinates of a surface of the area 220 (e.g., determined based on the stored CAD information of the area 220).

In one example, the computer 110 may be programmed to actuate the device 150 based on a presence of the device 150 in each of areas 210, 220, 230. The areas may have overlap and/or one area may be completely within another area, e.g., the area 230 is within the area 220. For example, as shown in Table 1, the computer 110 may be programmed to actuate the device 150 to provide haptic output based on whether the device 150 is located inside (IN) or outside (OUT) of a respective area 210, 220, 230. The computer 110 may be programmed to stop providing haptic output when the device is outside the area 210 or inside the area 230. The computer 110 may be programmed to actuate the device 150 to provide haptic output with the second frequency $F_2$ upon determining that the device 150 is located inside the area 210 but outside the areas 220, 230. The computer 110 may be programmed to actuate the device 150 to provide haptic output with the first frequency $F_1$ upon determining that the device 150 is inside the areas 210, 220 but outside the area 230.

TABLE 1

| Output | Area | | |
| --- | --- | --- | --- |
|  | 210 | 220 | 230 |
| No haptic output | OUT | OUT | OUT |
| $F_2$ | IN | OUT | OUT |
| $F_1$ | IN | IN | OUT |
| No haptic output | IN | IN | IN |

As discussed above, the computer 110 may be programmed to vary a frequency of the provided haptic output based on the location of the device 150. Additionally or alternatively, the computer 110 may be programmed to provide haptic output with an activation duty cycle that is at least in part based on the determined distance $d_1$. The activation duty cycle, in the context of present disclosure, is a ratio of an active time duration, e.g., 200 millisecond (ms), to an activation time period, e.g., 600 ms. Thus, a change of an activation duty cycle based on the distance $d_1$ may assist the user in locating a vehicle 100 component such as the knob 160. Additionally or alternatively, the computer 110 may be programmed to change a frequency of haptic output during the active time duration as discussed above, i.e., the computer 110 may be programmed to adjust the duty cycle and frequency of haptic output simultaneously.

Additionally or alternatively, the computer 110 may be programmed to change an intensity of haptic output based on the distance $d_1$ of the device 150 to the vehicle 100 component and/or presence of the device 150 in an area 210, 220, 230.

Processing

Figure 5:
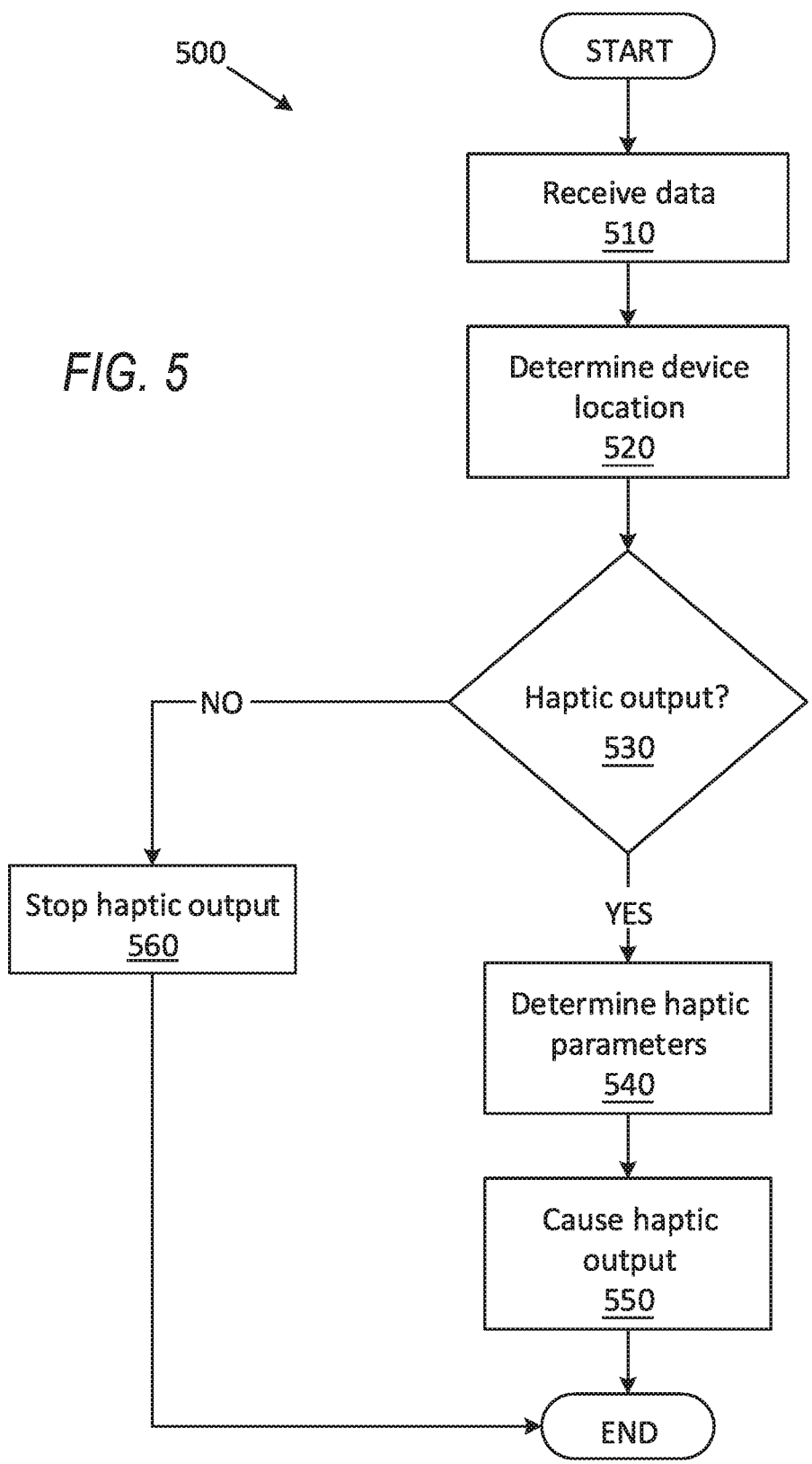
FIG. 5 is a flowchart of an exemplary process for providing haptic output via the wearable device.

FIG. 5 is a flowchart of an exemplary process 500 for providing haptic output via the wearable device. The vehicle 100 computer 110 may be programmed to execute blocks of the process 500.

The process 500 begins in a block 510, in which the computer 110 receives data from, e.g., the wearable device 150, the vehicle 100 sensors 130, the remote computer 185, etc. The computer 110 may be programmed to receive user request, e.g., an audio message requesting access to change vehicle 100 temperature. The computer 110 may be programmed to receive a wireless signal, e.g., a Bluetooth™ signal, from the device 150. The computer 110 may be programmed to receive data from vehicle 100 sensors 130, e.g., location coordinates of the wearable device 150 based on camera sensor 130 data. The computer 110 may be programmed to receive data including areas 210, 220, 230 shape, size, location, etc. and/or CAD information of vehicle 100 body, instrument panel 115, etc. from the remote computer 185, e.g., specified according to the vehicle 100 coordinate system.

Next, in a block 520, the computer 110 determines a location of the device 150. For example, the computer 110 may be programmed to determine location coordinates of the device 150 relative to a coordinate system with a point of origin at a reference point at the vehicle 100, such as the vehicle 100 center point 180. The computer 110 may be programmed to determine the location coordinates based on devices 150 wireless signal(s) received via the vehicle 100 wireless transceivers 170.

Next, in a decision block 530, the computer 110 determines to actuate a haptic output. For example, the computer 110 may be programmed to determine to actuate haptic output based on the determined location coordinates of the device and predetermined distance thresholds, e.g., the first distance threshold $L_1$, and/or areas, e.g., the area 210. If the computer 110 determines that a haptic output is warranted, then the process 500 proceeds to a block 540; otherwise the process 500 proceeds to a block 560.

In the block 540, the computer 110 determines haptic parameters (i.e., parameters for haptic output). In one example, the computer 110 may be programmed to determine the intensity, frequency, and/or activation duty cycle of the haptic output based on the determined location coordinates of the device 150 and the distance thresholds $L_1$, $L_2$, $L_3$, as shown in FIG. 2. In another example, the computer 110 determines the parameters of haptic output based on the determined location coordinates of the device 150, the areas 210, 220, 230, and thresholds described in Table 1.

Next, in a block 550, the computer 110 actuates the wearable device 150 to provide haptic output. For example, the computer 110 may be programmed to actuate the wearable device 150, e.g., by sending a wireless Bluetooth™ signal to the device 150 including the determined haptic parameters. Following the block 550, the process 500 ends, or alternatively returns to the block 510, although not shown in FIG. 5.

In the block 560, the computer 110 stops a haptic out. For example, the computer 110 may be programmed to send a deactivation message to the wearable device 150 via, e.g., Bluetooth™. As another example, the computer 110 may be programmed to send haptic parameters including an intensity of 0 (zero). Following the block 560, the process 500 ends, or alternatively returns to the block 510, although not shown in FIG. 5.

The article "a" modifying a noun should be understood as meaning one or more unless stated otherwise, or context requires otherwise. The phrase "based on" encompasses being partly or entirely based on.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A computer, comprising a processor programmed to:
receive data specifying a shape and a location of a component in an interior of a vehicle according to a vehicle coordinate system;
determine a three-dimensional volume based on the shape and the location of the component, wherein the three-dimensional volume is larger than the component;
receive data specifying a location of a wearable device in the vehicle according to the vehicle coordinate system that provides coordinates for an interior of the vehicle;
determine whether the wearable device is within the determined three-dimensional volume; and actuate the wearable device to provide haptic output based on whether the device is within the determined three-dimensional volume.

2. The computer of claim 1, wherein the processor is further programmed to determine the location of the wearable device in the vehicle coordinate system based on a wireless signal received from a vehicle wireless transceiver.

3. The computer of claim 1, wherein the processor is further programmed to:
stop providing haptic output upon determining that the wearable device is within the determined three-dimensional volume;
actuate the wearable device to provide haptic output with a first frequency upon determining that the wearable device is outside the determined three-dimensional volume and within a second determined three-dimensional volume;
actuate the wearable device to provide haptic output with a second frequency upon determining that the wearable device is outside the second determined three-dimensional volume and within a third determined three-dimensional volume; and
stop providing haptic output upon determining that the wearable device is outside the third three-dimensional volume, wherein the second determined three-dimensional volume is within the third determined three-dimensional volume.

4. The computer of claim 1, wherein the processor is further programmed to:
determine whether the wearable device is within the determined three-dimensional volume, based on a wireless signal received from a vehicle wireless transceiver; and
actuate the wearable device to provide haptic output with a first frequency upon determining that the device is within the determined three-dimensional volume.

5. The computer of claim 4, wherein the processor is further programmed to actuate the wearable device to provide haptic output with a second frequency upon determining that the device is outside the determined three-dimensional volume.

6. The computer of claim 4, wherein the determined three-dimensional volume is cylindrically shaped and has a longitudinal axis perpendicular to an exterior surface of a vehicle instrument panel.

7. The computer of claim 4, wherein the determined three-dimensional volume is bell-shaped and encompasses the component, and the bell-shaped determined three-dimensional volume has a flat bottom touching a vehicle instrument panel.

8. The computer of claim 4, wherein the determined three-dimensional volume has a solid rectangle shape with a bottom surface touching a vehicle instrument panel.

9. The computer of claim 1, further programmed to provide haptic output with an intensity that is at least in part based on a determined distance of the wearable device from the component in the vehicle.

10. The computer of claim 1, further programmed to provide haptic output with an activation duty cycle that is at least in part based on a determined distance of the wearable device from the component in the vehicle, wherein the activation duty cycle is a ratio of an active time duration to an activation time period.

11. The computer of claim 1, wherein a vehicle human machine interface includes the component.

12. A method, comprising:
receiving data specifying a shape and a location of a component in an interior of a vehicle according to a vehicle coordinate system;
determining a three-dimensional volume based on the shape and the location of the component, wherein the three-dimensional volume is larger than the component;
receiving data specifying a location of a wearable device in the vehicle according to the vehicle coordinate system that provides coordinates for an interior of the vehicle;
determining whether the wearable device is within the determined three-dimensional volume; and
actuating the wearable device to provide haptic output based on whether the device is within the predetermined three-dimensional volume.

13. The method of claim 12, further comprising determining the location of the wearable device in the vehicle coordinate system based on a wireless signal received from a vehicle wireless transceiver.

14. The method of claim 12, further comprising:
stopping providing haptic output upon determining that the wearable device is within the determined three-dimensional volume;
actuating the wearable device to provide haptic output with a first frequency upon determining that the wearable device is outside the determined three-dimensional volume and within a second determined three-dimensional volume;
actuating the wearable device to provide haptic output with a second frequency upon determining that wearable device is outside the second determined three-dimensional volume and within a third determined three-dimensional volume; and
stopping providing haptic output upon determining that the wearable device is outside the third three-dimensional volume, wherein the second determined three-dimensional volume is within the third determined three-dimensional volume.

15. The method of claim 12, further comprising:
determining whether the wearable device is within the determined three-dimensional volume, based on a wireless signal received from a vehicle wireless transceiver; and
actuating the wearable device to provide haptic output with a first frequency upon determining that the device is within the determined three-dimensional volume.

16. The method of claim 15, further comprising actuating the wearable device to provide haptic output with a second frequency upon determining that the device is outside the determined three-dimensional volume.

17. The method of claim 15, wherein the determined three-dimensional volume has a solid rectangle shape with a bottom surface touching a vehicle instrument panel.

18. The method of claim 12, further comprising providing haptic output with an intensity that is at least in part based on a determined distance of the wearable device from the component in the vehicle.

19. The method of claim 12, further comprising providing haptic output with an activation duty cycle that is at least in part based on a determined distance of the wearable device from the component in the vehicle, wherein the activation duty cycle is a ratio of an active time duration to an activation time period.

* * * * *